United States Patent [19]

Becker

[11] 4,008,642

[45] Feb. 22, 1977

[54] FASTENING DEVICE

[75] Inventor: Phillip D. Becker, Southbury, Conn.

[73] Assignee: Buell Industries, Inc., Waterbury, Conn.

[22] Filed: Jan. 8, 1976

[21] Appl. No.: 647,615

[52] U.S. Cl. .......................... 85/35; 85/36; 151/41.73; 339/95 R

[51] Int. Cl.[2] .......................... F16B 37/14

[58] Field of Search .......................... 85/35, 36, 55; 151/41.73, 41.75; 339/95 R; 24/217 R, 108; 16/121

[56] References Cited

UNITED STATES PATENTS

| | | | |
|---|---|---|---|
| 1,597,958 | 8/1926 | Eby | 85/35 X |
| 2,234,097 | 3/1941 | Tinnerman | 85/36 X |
| 2,398,374 | 4/1946 | Hartman | 151/41.75 |
| 2,636,065 | 4/1953 | Fiske | 85/35 X |
| 2,822,712 | 2/1958 | Garman | 85/36 X |
| 2,982,989 | 5/1961 | Heyer | 151/41.73 X |
| 3,032,807 | 5/1962 | Lanius | 85/36 X |
| 3,507,182 | 4/1970 | Tinnerman | 85/35 X |

FOREIGN PATENTS OR APPLICATIONS

| | | | |
|---|---|---|---|
| 1,475,148 | 5/1969 | Germany | 85/36 |

*Primary Examiner*—Ramon S. Britts
*Attorney, Agent, or Firm*—St. Onge Mayers Steward & Reens

[57] ABSTRACT

A fastening device comprises an electrically conductive sheet metal nut element which may function to complete electrical connections and a plastic, electrically insulating cap member which covers the nut element. Even though plastic material such as that from which the cap member is made is pliable and exhibits a certain amount of plastic flow or "creep," the cap member and nut element are configured so that they can be tightly assembled to transmit high torques through the cap member to the nut element. Specifically, the nut element is formed with a web portion, which is generally perpendicular to the fastening device axis, and a stud-engaging configuration associated with the web portion. A cylindrical section is formed at the periphery of the web portion to extend in the direction of the device axis and has at least one pair of circumferentially opposing wings which project outwardly away from the axis. The cap member is formed in one piece to complement the nut element and includes a cover and a nut element embracing skirt formed at the periphery of the cover to extend in the direction of the device axis. The skirt is shaped and sized to fit in tight conformity about the cylindrical nut element section so that the wings bite into the inner skirt wall and thereby prevent relative nut element-cap member rotation. Further, when assembled, the margin of the cap member skirt opposite the cover is flush with the nut element web portion so that working loads on the nut element do not tend to dislodge it from the cap member.

7 Claims, 4 Drawing Figures

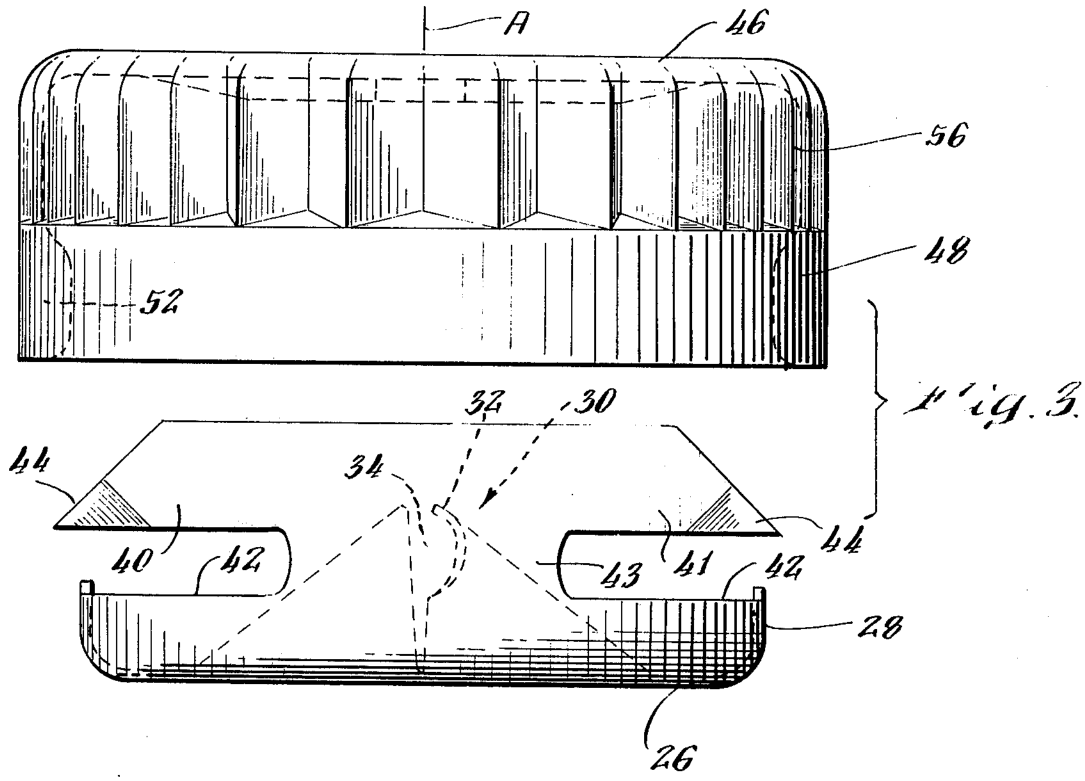
Fig. 3.
Fig. 4.
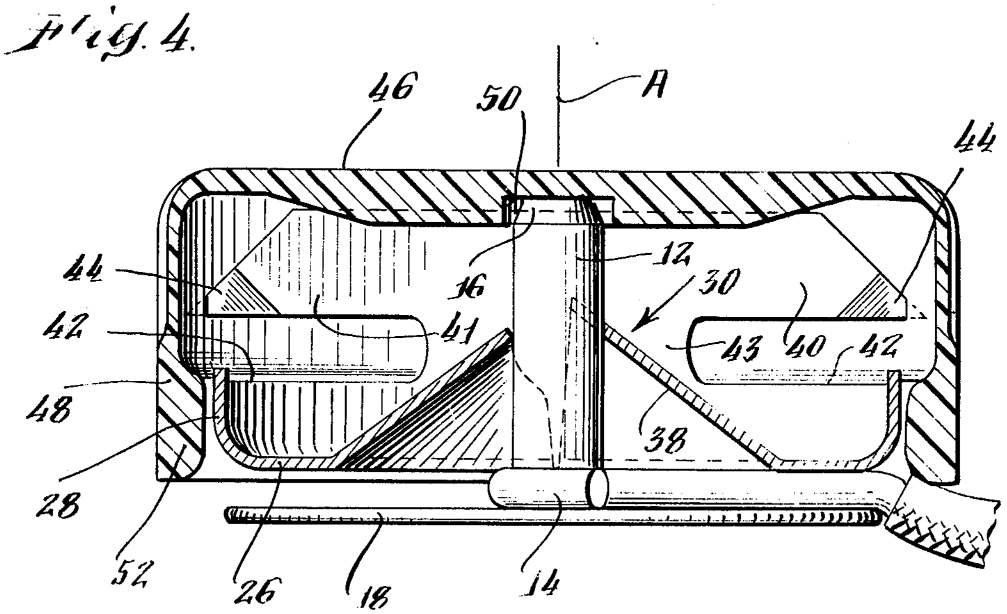

FASTENING DEVICE

BACKGROUND OF THE INVENTION

1. Field of the Invention

The present invention relates to a fastening device that is particularly useful for securing an electrical conductor, such as a wire, to a conductive stud which has a base extending generally perpendicularly to the stud axis. Fastening devices of this type are often used in the automobile industry to interconnect electrical conductors such as the various lead wires and terminal studs in automobile systems which warn occupants to buckle their seat belts. In these applications, because of the large number of connections made and because of the large number of automobiles produced, it is desirable that fastening devices be designed for easy installation on the stud so that the connection can be made positively, quickly and inexpensively. The fastener should also be easily removable by hand without destroying the stud in order to facilitate subsequent repair of the electrical system. Moreover, it is of course desirable to insulate the electrical connection to prevent short-circuiting as well as to prevent injury to assembly and repair personnel.

2. Description of the Prior Art

Various fastening devices which are engagable on threaded or initially threadless studs are known. However, many of these devices are, for good reason, not intended to be used as electrical conductor connectors. For example, neither the conductive components of nor the interconnections which would be made by some fastening devices are insulated (see e.g., U.S. Pat. Nos. 2,334,046 (Tinnerman); 2,339,664 (Tinnerman); 2,846,744 (Becker); and 2,584,828 (Ballou, Jr.)).

Other fastening devices are characterized by certain drawbacks even though their metal components are insulated by some form of cover. For example, U.S. Pat. No. 3,507,182 (Tinnerman) discloses a fastener comprising a sheet metal nut clamped between interengaging plastic nut cover components. Considerable expense is required to make and assemble the various components of this composite construction. Therefore, its practical usefulness is limited in applications where large volumes of inexpensive fasteners are needed. The fastener also has a hexagonal shape which assists in providing positive engagement between the nut and nut cover but this shape is not the best for a fastener designed to be installed or removed by hand.

Moreover, this Tinnerman device, as well as that disclosed in U.S. Pat. No. 2,582,580 (Bedford, Jr.), would not provide a good electrical connection between the stud to which it is attached and a lead wire unless the stud had a broad conductive base because the conductive fastener component is isolated from the wire. Similarly, U.S. Pat. No. 3,007,726 (Parkin) discloses a device which would only provide a good electrical connection if the stud had a specially formed base against which the lead wire could be clamped.

Further, fastening devices which are designed for easy installation on a threaded or initially threadless stud have been proposed. For example, self-threading devices which cut threads into a stud when installed thereon are disclosed in U.S. Pat. Nos. 2,986,059 (Duffy et al.); 3,368,444 (Holton); 3,456,705 (Tinnerman); and 3,507,182 (Tinnerman). The device disclosed in the Bedford, Jr. Patent may be pushed onto a stud but may be rotationally removed. However, these devices exhibit many of the same deficiencies described above when used as electrical connectors.

The various problems encountered in use of prior art fasteners are aggravated by practical production problems. In particular, plastic from which nut covers are often made, has a tendency to flow or "creep". Therefore, these covers tend to yield and loosen on the sheet metal nuts after they have been assembled making subsequent removal of the fastener difficult.

SUMMARY OF THE INVENTION

In a preferred embodiment, to be described below in detail, the fastening device of the present invention is particularly useful for securing an electrical conductor, such as a wire, to a conductive stud which has a base extending generally perpendicularly to the stud axis. This fastening device may be easily installed on a threadless or threaded stud and may be easily, rotatively removed by hand without damaging the stud by unscrewing it therefrom. Accordingly, this device permits rapid completion of such electrical connections, yet permits easy subsequent repair should it be needed.

The fastening device of the present invention further effects a positive electrical connection between a wire and a stud to which it is attached regardless of the physical configuration of the stud or its base. The exterior of the fastener as well as the connection itself are insulated to prevent short-circuiting.

Specifically, the fastening device comprises a conductive sheet metal nut element that completes the electrical connection and a plastic insulating cap member covers the nut element to shield the connection. Perhaps most importantly, the nut element and cap member are configured to be tightly assembled, despite the plastic flow of the cap, so that high torques can be transmitted through the cap to the nut element to facilitate removal and installation of the device.

The fastening device nut element, which is stamped from resilient sheet metal, includes a web portion that is formed generally perpendicularly to the fastening device axis and has a stud receiving and engaging configuration. A generally cylindrical section is integrally formed at the periphery of the web portion and has at least two relatively long wings or ears which extend circumferentially in opposite directions from a relatively narrow center support to give a T-shaped appearance. A sharp point is formed at the end of each wing and is sprung outwardly from the device axis in a twisting manner to also form a cam-line surface.

The electrically insulating plastic cap member is of one-piece molded construction and includes a cover and a cylindrical nut element embracing skirt which is formed at the periphery of the cover. The skirt is shaped and sized to fit in tight conformity about the nut element cylindrical section with the sharp wing points biting into the inner wall of the skirt. In this manner, relative rotation of the nut element and cap member is prevented.

As noted, the cap member skirt, nut element section, and, hence, the device are cylindrical or rounded. This is considered to be the best shape for fasteners which are installed or removed by hand.

The cap member and nut element are assembled by pressing the nut element into the cap member. The twisted cam-like wing surface at each point causes the wings to cam inwardly toward the device axis during assembly so as to not appreciably damage the cap member. However, the natural resilience of the sheet metal from which the nut element is made causes the points to spring outwardly into tight biting engagement with the cap member skirt once assembly is complete.

When assembled, the margin of the cap member skirt opposite its cover is flush with the nut element web portion. Accordingly, a working load on the nut element does not tend to pull or otherwise dislodge it from the cap member. The cap member skirt may be formed with a radially inwardly projecting annular lip at its margin opposite the cover which also engages the nut element wings to prevent axial nut element-cap member disengagement.

The one-piece construction of the cap member and the complementing shapes of the cap member skirt and nut element cylindrical section facilitate easy assembly of the respective components by merely pressing them axially together. Furthermore, since the device has only two easily manufactured components, production economies prior to assembly can be realized. Therefore, this fastening device may easily be produced in large volume to be used, for example, by the automotive industry.

Accordingly, it is an object of the present invention to provide a fastening device for making a positive electrical connection between, for example, a wire lead and a stud in a simple, efficient, and inexpensive manner.

Other objects, aspects and advantages of the present invention will be pointed out in, or will be understood from the following detailed description provided below in conjunction with the accompanying drawings.

BRIEF DESCRIPTION OF THE DRAWINGS

FIG. 3 is an exploded side elevational view of this fastening device.

FIG. 4 is a vertical cross-sectional view taken through plane 4—4 in FIG. 2 showing the assembled components of this fastening device.

DETAILED DESCRIPTION OF THE PREFERRED EMBODIMENT

Figure 1:
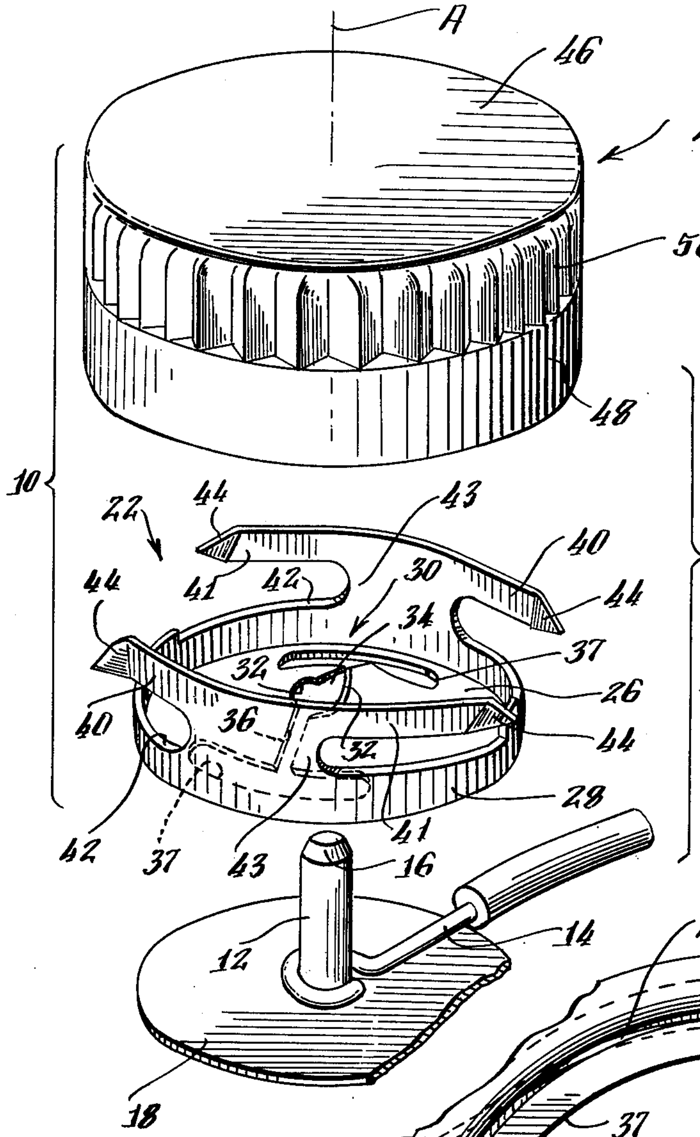
FIG. 1 is an exploded perspective view of the fastening device of the present invention showing its cap member and nut element, and of a stud and base to which it is attached.

FIG. 1 illustrates the fastening device of the present invention, generally indicated at 10, in exploded form and positioned to be installed on a stud 12. For electrical wiring purposes, stud 12 is ordinarily electrically conductive and serves as a terminal to which a wire 14 is attached. The stud, which may also have a slightly tapered upper end 16, projects perpendicularly from a base 18 that may or may not be conductive.

The fastening device 10 includes a nut element, generally indicated at 22, and an insulating cap member, generally indicated at 24, which covers and embraces the nut element in a fashion to be described below in detail.

As shown in FIGS. 1 through 4, the nut element, which may be stamped from resilient conductive sheet material such as sheet metal, includes a circular web portion 26 and a cylindrical section 28 which is integrally formed at the periphery of the web portion to extend in the direction of the fastening device axis A. At its center, the web portion 26 is stamped with a stud-engaging arrangement 30 designed so that the fastening device can be non-rotatively pushed onto yet rotatively removed from stud 12. Though other stud-engaging arrangements may be employed, in the preferred embodiment the arrangement includes a pair of helically inclined, thread cutting teeth 32 which define a stud-receiving hole 34 at the center of web portion 26. In order to form these teeth, the web portion is diametrically split at 36 between two arcuate slots 37. Accordingly, the opposed teeth 32 form independent tabs which are flexible in the direction of the fastening device axis A to expand the hole 34 when a stud is received therein. However, once installed on a stud, the natural resilience of the sheet metal from which the nut element is made causes the opposed teeth tabs to spring toward their original positions and thus bite into the side of stud 12.

During installation of the fastening device, the stud is guided to the stud-engaging hole by the conically shaped bottom surface 38 (FIG. 4) of web portion 26 which is preferably formed during the nut stamping operation.

As shown in FIGS. 1, 3 and 4, the nut element cylindrical section 28 is formed with two winged segments each having two relatively long, circumferentially opposing ears or wings 40 and 41 defined by undercut slots 42 disposed in the cylinder side wall. The wings are permanently bent or sprung outwardly away from the axis A. Accordingly, each wing segment, including the relatively narrow center support 43 defined between opposing slots 42, has a T-shaped appearance. Additionally, each wing is formed with a sharp point 44 that is also permanently bent or twisted outwardly away from the fastening device axis A to form a downwardly outwardly sloping cam-like surface. These points engage the cap member in a fashion described below in detail.

As shown in FIGS. 1, 3 and 4, the cap member 24 is formed with a circular cover 46 and an integral depending cylindrical skirt 48. The inside surface of cover 46 is formed with a depression 50 which may receive the tip 16 of stud 12 when the fastening device is engaged thereon. Further, the inner wall 54 of cylindrical skirt 48 is formed with a radially inwardly projecting annular lip 52. The nut element and cap member are assembled by pushing the element axially into the cap member with the web portion opposing the cover. The lower edge of annular lip 52 is rounded to cause, in cooperation with the twisted wing points, a radial inward camming action of the outwardly sprung wings during the assembly operation. This cooperating cam arrangement between the nut element wings and the cap member lip permits the pointed wings to be exaggeratedly sprung outwardly without damaging the cap member during assembly. Similarly, the annular lip can provide a heavy undercut.

Figure 2:
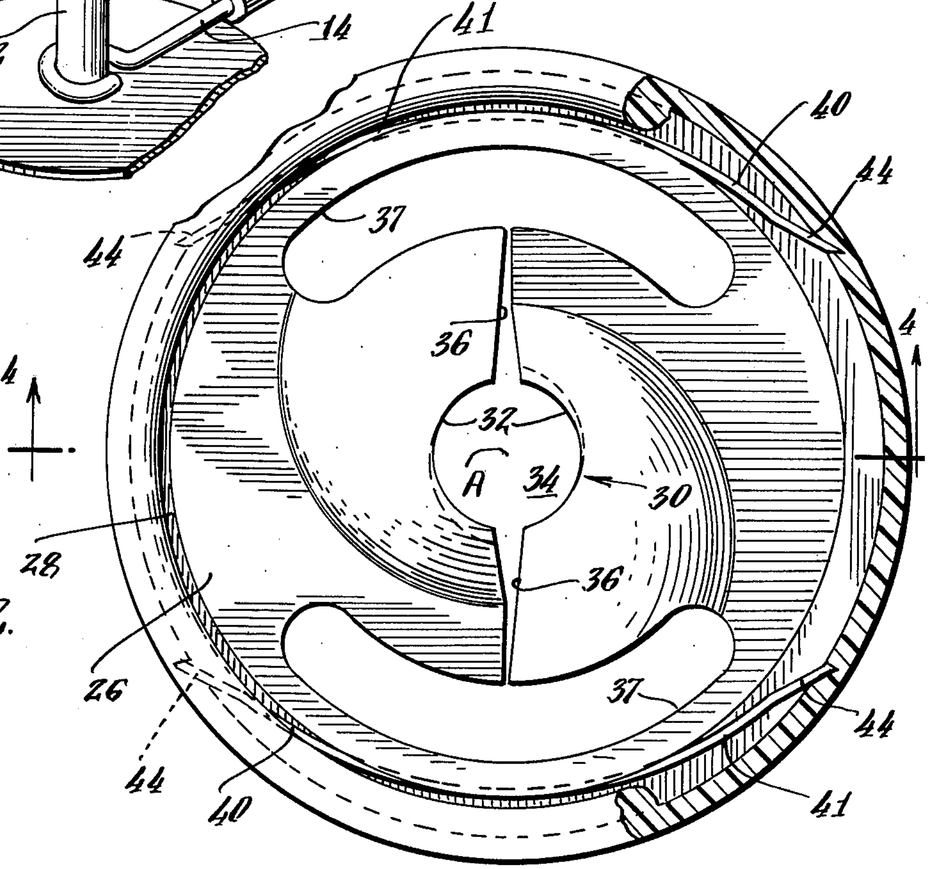
FIG. 2 is a bottom view shown partly in cross-section of this fastening device.

As can be seen in FIGS. 2 and 4, when the nut element and cap member are assembled, the points 44 of nut element wings 40 and 41 engage the inner wall 54 of cap member skirt 48 at a position axially between the annular lip 52 and cover 46. Since the wings are formed to project outwardly away from the device axis and since the nut element is made from a resilient material, the wing points bite deeply into the inner wall 54 of skirt 48. In addition, since the respective points 44 on each pair of wings 40 and 41 are in circumferential opposition, the nut element is securely locked against rotation in the cap member when the two are assembled. It has been found that this arrangement is capable of withstanding relatively large torques when the cap member is turned to remove it from a stud. In this regard, the outer surface of cylindrical skirt 48 is knurled at 56 to increase the possible purchase on the fastener when it is removed by hand for repair or replacement.

When assembled, as shown in FIG. 4, the lower margin 58 of the cap member skirt 48 is substantially flush with web portion 26 of nut element 22. Therefore, a large surface area of the web portion is exposed to a wire without interference from the cap member 24 when the wire is clamped against the base 18. Since the web portion is conductive metal in firm clamped contact with the wire and since its helically opposed threaded teeth cut into the stud during the installation operation to establish an electrically conductive path therebetween, a good electrical connection is made between the wire and the stud. This connection results whether or not the stud base 18 has special shape or is conductive or whether or not the wire is wound tightly about the stud. Moreover, any working stress placed on the fastening device through the stud, for example, by forces which would tend to pull the stud out of the nut element, work against the nut element web portion rather than against the cap member. Accordingly, such stress does not tend to pull the nut element out of the cap member or otherwise disassemble the two.

The one-piece cap member is easily manufactured by well-known injection molding or hot stamping processes. Therefore, cap members may be produced in large numbers at low cost. Similarly, the nut element may be easily stamped from a continuous piece of sheet metal by well-known stamping processes and the assembly of the two is easily accomplished by pressing the nut element into the cap member. Accordingly, the entire fastener is inexpensive and can be used in applications requiring large numbers of fasteners.

The fastening device of the present invention may be installed on a stud by pushing it axially thereon. Removal may be accomplished, however, by twisting the fastening device off without damaging the stud. Therefore, repairs required at an electrical connection made by the fastening device of the present invention or in the electrical system of which it is a part, can be carried out cheaply and with minimum effort.

Although a specific embodiment of the present invention has been described above in detail, it is to be understood that this is for purposes of illustration. Modifications may be made to the described fastening device by those skilled in the art in order to adapt it to particular fastening or electric circuit completing applications.

What is claimed is:

1. A fastening device, having an axis, for engaging a stud and comprising:

A. a sheet metal nut element including 1. a web portion extending generally perpendicularly to the fastening device axis;
2. means associated with said web portion for engaging a stud;
3. a generally tubular section formed at the periphery of said web portion, extending therefrom in the direction of the fastening device axis and having at least one pair of circumferentially opposing wings which project outwardly away from the fastening device axis, each wing having its major dimension also extending in the direction of the fastening device axis, and B. a one-piece cap member including, 1. a cover and
2. a nut element embracing skirt, formed at the periphery of said cover extending therefrom in the direction of the fastening device axis, shaped and sized to fit in tight conformity about said tubular section with said wings biting into the inner wall of said skirt in circumferentially opposing directions to prevent relative rotation of said nut element and said cap in either angular direction, said nut element web portion and cap member cover being positioned at opposite margins of said device.

2. The fastening device as claimed in claim 1 wherein each of said wings has an end provided with a sharp point that bites into the inner wall of said cap member skirt.

3. The fastening device as claimed in claim 2 wherein said wing points are twisted and bent outwardly away from the fastening device to form a cam-like surface that cooperates with said cap member skirt to cam said wings and points inwardly toward the device axis during nut element-cap member assembly.

4. The fastening device as claimed in claim 1 wherein said nut element tubular section has at least one relatively narrow center support extending in the direction of the fastening device axis from which said pair of wings project to give a T-shaped appearance.

5. The fastening device as claimed in claim 1 wherein said cap member skirt is formed at its margin opposite said cover with a radially inwardly projecting annular lip and wherein said nut element wings bite into the cap tubular section inner wall at locations axially intermediate said lip and said cover.

6. The fastening device as claimed in claim 1 wherein the outer wall of said cap member tubular section is knurled to increase the possible purchase thereon during rotative disengagement of said fastening device from the stud by hand.

7. The fastening device as claimed in claim 1 wherein inner surface of said cap member cover is formed with a stud engaging depression, in axial alignment with said nut element stud receiving hole, for receiving the end of a stud.

* * * * *